(12) United States Patent
Gretz (10) Patent No.: US 6,779,764 B1
(45) Date of Patent: Aug. 24, 2004

(54) GARDEN POST WITH ELONGATED ELECTRICAL BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/328,318

(22) Filed: Dec. 23, 2002

Related U.S. Application Data (63) Continuation-in-part of application No. 10/253,185, filed on Sep. 24, 2002, now Pat. No. 6,585,221, which is a continuation-in-part of application No. 10/112,563, filed on Mar. 28, 2002, which is a continuation-in-part of application No. 09/860,064, filed on May 17, 2001.

(51) Int. Cl.[7] .............................................. F16M 13/00
(52) U.S. Cl. ...................... 248/156; 248/530; 248/545; 248/87; 248/85
(58) Field of Search ................................ 248/156, 530, 248/545, 87, 85; 362/431, 382

(56) References Cited

U.S. PATENT DOCUMENTS

| 3,257,496 | A | * | 6/1966 | Hamilton | 174/38 |
|---|---|---|---|---|---|
| 3,435,124 | A | * | 3/1969 | Channell | 174/38 |
| 3,466,379 | A | * | 9/1969 | Lohman | 174/38 |
| 3,585,456 | A | * | 6/1971 | Phillips, Jr. | 361/663 |
| 3,652,779 | A | * | 3/1972 | Grinols | 174/38 |
| 4,025,825 | A | * | 5/1977 | Shrader | 361/670 |
| 4,076,198 | A | | 2/1978 | Garrett | |
| 4,266,266 | A | | 5/1981 | Sanner | |
| 4,519,657 | A | * | 5/1985 | Jensen | 439/191 |
| 4,751,610 | A | | 6/1988 | Nickola | |
| 4,793,111 | A | * | 12/1988 | Shewchuk | 52/298 |
| 4,858,877 | A | * | 8/1989 | Carter | 248/545 |
| 4,951,182 | A | * | 8/1990 | Simonson et al. | 362/145 |
| 5,184,279 | A | * | 2/1993 | Horn | 361/641 |

* cited by examiner

*Primary Examiner*—Leslie A. Braun
*Assistant Examiner*—Steven Marsh (57) ABSTRACT

A mounting device or post for supporting an electrical fixture or box-mounted electrical device in an outdoor setting. The post provides an internal electrical box that may be configured by the installer as a standard size electrical box or a large electrical box capable of accepting several electrical devices. The top of the electrical box is integral with the top of the post and includes a mounting assembly for an electrical fixture, thereby allowing an electrical fixture to be mounted on the post with all wiring connections contained within the box. An opening in the side wall of the post provides access to the electrical box and is typically provided with a removable cover that is secured thereto. Electrical receptacles, switches, ground fault circuit interrupters or similar devices can be mounted in the box opening. The bottom of the post includes integral projections to anchor the post securely in the ground and a large cable entryway to allow lead in of electrical cables into the post and the electrical box within.

14 Claims, 8 Drawing Sheets

GARDEN POST WITH ELONGATED ELECTRICAL BOX

This application is a Continuation-In-Part of U.S. patent application Ser. No. 10/253,185 entitled "Garden Post", filed Sep. 24, 2002 now U.S. Pat. No. 6,585,221 and still pending, which in turn is a Continuation-In-Part of U.S. patent application Ser. No. 10/112,563 entitled "Outdoor Garden Post", filed Mar. 28, 2002 and still pending, which in turn is a Continuation-In-Part of U.S. patent application Ser. No. 09/860,064 entitled "Landscape Fixture Support Post", filed May 17, 2001 and still pending.

FIELD OF THE INVENTION

The present invention relates to the field of outdoor ground-level fixtures and electrical devices, and more particularly to a support post that provides a large electrical box to enable easy installation of a plurality of electrical devices, such as receptacles or switches, in an outdoor setting.

BACKGROUND OF THE INVENTION

Many prior art mounting devices have been proposed for the installation of light fixtures in outdoor residential areas, such as along walkways or driveways, or around structures such as decks, swimming pools, or patios. Typically the prior art mounting devices are limited in functionality as they provide only for the mounting of light fixtures and contain no provision for mounting additional electrical devices. For example, it may be desirable for a homeowner to mount light fixtures along a walkway and to also include electrical service outlets along the same walkway. Or the homeowner may wish to mount a light fixture along with several electrical devices, such as a duplex receptacle for providing power, a photocell for sensing ambient light conditions to turn the light fixtures on and off automatically, and a switch to override the photocell. Additionally, it would be advantageous for the mounting device to be able to accept standard wall-mounted electrical devices to widen the range of possible electrical devices available to be mounted and to make it easy for a homeowner to obtain a desired device.

U.S. patent application Ser. No. 09/860,064, entitled "Landscape Fixture Support Post", filed May 17, 2001 by the inventor of the present invention and incorporated herein by reference in its entirety, disclosed a mounting device for mounting a lighting fixture in an outdoor setting. The mounting device included a hollow cylindrical post. The lower portion of the post included integral projections to enable easy anchoring in the ground and a wide entryway for electrical supply cable. The radial projections, being integral with the post body, were less likely to separate from the post than stabilizer devices held by fasteners, as is typical of prior art posts. The post provided a top fitting for mounting a light fixture and a side port to provide access to the interior of the post for completing wiring connections.

U.S. patent application Ser. No. 10/112,563, entitled "Outdoor Garden Post", filed Mar. 28, 2002 by the inventor of the present invention and incorporated herein by reference in its entirety, improved upon the design of an outdoor mounting device by providing an electrical junction box having a top wall and four side walls integral with the post. The mounting device provided a secure junction box for mounting an electrical device, such as an outlet receptacle in addition to a lighting fixture. Wiring connections to both the electrical device and the lighting fixture could therefore be completed within a secure electrical junction box. By isolating the internal wiring connections to both the device and fixture within a secure junction box, the wiring connections were thus better protected from ground moisture and other environmental hazards. The mounting device also enabled the junction box to accept all standard wall-mounted electrical devices, increasing its functionality.

U.S. patent application Ser. No. 10/253,185, entitled "Garden Post", filed Sep. 24, 2002 by the inventor of the present invention and incorporated herein by reference in its entirety, improved upon the functionality of the outdoor garden post by disclosing a mounting device for mounting a fixture at a user-selectable height in an outdoor setting. The mounting device was modular in nature, with the installer able to add various modules to raise the height of a light fixture and electrical device to a desired level. The mounting device also included a secure electrical junction box for enclosing and protecting wiring connections.

Although the aforementioned disclosures improved upon prior art mounting devices by providing an electrical box for mounting one standard wall-mounted electrical device, the electrical box was limited in size and typically could accommodate only one electrical device. The devices provided by these disclosures were therefore inadequate in those situations in which the user wished to install several electrical services in one mounting device.

For example, Although U.S. patent application Ser. No. 10/112,563 provides a secure electrical junction box for enclosing wiring connections, the electrical box is located in the top of the mounting device and can accommodate at most one electrical device. A user may want to install several electrical devices within one mounting device. What is needed therefore, is a mounting device that provides a large electrical box capable of accommodating several electrical devices. Additionally, the mounting device should provide the improved features of the aforementioned disclosures, including a secure electrical junction box for isolating wiring connections from environmental hazards, integral projections to improve anchoring to the ground, and a wide lower cable entryway to allow easy access for underground cables. The mounting device should also be stable, durable, inexpensive to manufacture, easy to install, and easy to maintain.

OBJECTS OF THE INVENTION

A first advantage of the present invention is that it provides a mounting device with a large electrical box for supporting one or more electrical devices in an outdoor setting. The box is an Underwriters Labs (UL) listed box that is weatherproof and provides ample space for easy mounting of electrical devices such as electrical receptacles and switches. The electrical box can be configured to a standard or large size as desired by the user.

An additional advantage is that the mounting device provides an arrangement for easily mounting a light fixture. Either low voltage or line voltage fixtures may be used.

Additionally, the fixture-mounting device is stable, durable, easily maintained and accessed after installation, and is easy and inexpensive to manufacture.

Another advantage exhibited by the mounting device of the present invention is that it is easily installed and adapted to different heights by a homeowner.

These, and other objects, will become readily apparent to one of skill in the art having regard for this disclosure.

BRIEF DESCRIPTION OF THE INVENTION

The invention is a mounting device that is modular in nature and provides a means of supporting a fixture or box-mounted electrical device above the ground. The device includes a top member for accepting a fixture, a box-mounted electrical device, or a combination of each. A base member includes a large entryway to allow lead in of electrical cables into the device and integral projections for secure anchoring to the ground. One or more extenders may be included to increase the height of the device.

The mounting device, or garden post, may be used for mounting devices that are typically used in a landscape surrounding such as lights, cameras, photocells to control lighting, and other similar devices. An UL-listed electrical box is provided within the top member for housing electrical receptacles, switches, ground fault circuit interrupters ("GFCI's") or similar devices that typically are secured within an UL-listed box. The mounting device can be configured to provide a standard-sized or a large electrical box, depending on the number of electrical devices that will be installed therein.

In a preferred embodiment a top member and base member may be secured together to form a mounting device or garden post. Thus secured, the members comprise an elongated body of rectangular cross section having a top and a bottom end. The top end protrudes from the ground and includes an opening through which various devices may be mounted or connected. The bottom end is tapered so that, when buried in the ground, it provides a large entryway for leading electrical cables into the enclosure. The assembled garden post is essentially hollow but with a portion closed off to provide an UL-listed electrical junction box. The installer can adapt the size of the electrical box by selecting a position for closing off the interior of the hollow members. An opening in the side wall provides access to the electrical box from one side of the post and is typically provided with a removable cover that is secured thereto.

REFERENCE NUMERALS USED IN THE SPECIFICATION AND DRAWINGS

20—mounting device or garden post
22—top member
24—base member
26—side walls of top member
28—closed top
30—open bottom of top member
32—side walls of base member
32A—front side wall of base member
34—open top of base member
36—open bottom of base member
38—bottom edge of base member
40—cable entryway
42—integral projections
44—aperture in projection
46—stiffening rib
48—fillet
50—lower edge of projection
52—aperture in closed top
54—electrically conductive bushing
56—closure arrangement
58—closure panel
60—slot
62—breakaway section
64—boss on closure panel
66—aperture
68—fastener
70—fastening arrangement
72—collar on top member
74—inner wall of collar
76—adhesive
78—joint area
80—extender
81—bottom end of extender
82—collar on extender
84—electrically conductive nut
86—grounding lug
88—grounding wire
90—opening
92—standard size electrical junction box
94—duplex receptacle
96—fastener
98—boss on top member
100—gasket
102—faceplate
104—large electrical junction box
106—distal end of integral projection
108—electrical cable
110—ground level

DETAILED DESCRIPTION

As this invention may be more easily explained by reference to the attached drawings, it should be noted that the figures are representative and exemplary of the invention only, and should not be construed as limiting the scope of the invention in any way.

The present invention consists of a mounting device for providing electrical services in a landscape setting. The garden post is suitable for mounting a wide range of fixtures and electrical devices that are typically mounted in a landscape. Such fixtures and electrical devices include, but are not limited to, lighting fixtures, sensors such as rain gauges, light sensors, motion sensors, and infrared sensors, cameras, microphones, receptacles, switches, ground fault circuit interrupt (GFCI) receptacles, and vibration detectors. The mounting device is modular in nature, consisting of at least a top member and a base member, and may include one or more extenders to increase the height of the fixture or electrical device above the landscape. The mounting device includes a closure arrangement that can be secured within either the top or bottom members to provide a secure, weatherproof electrical box. The user can select the position for the closure arrangement, thereby providing either a standard-sized or a large electrical box.

Figure 1:
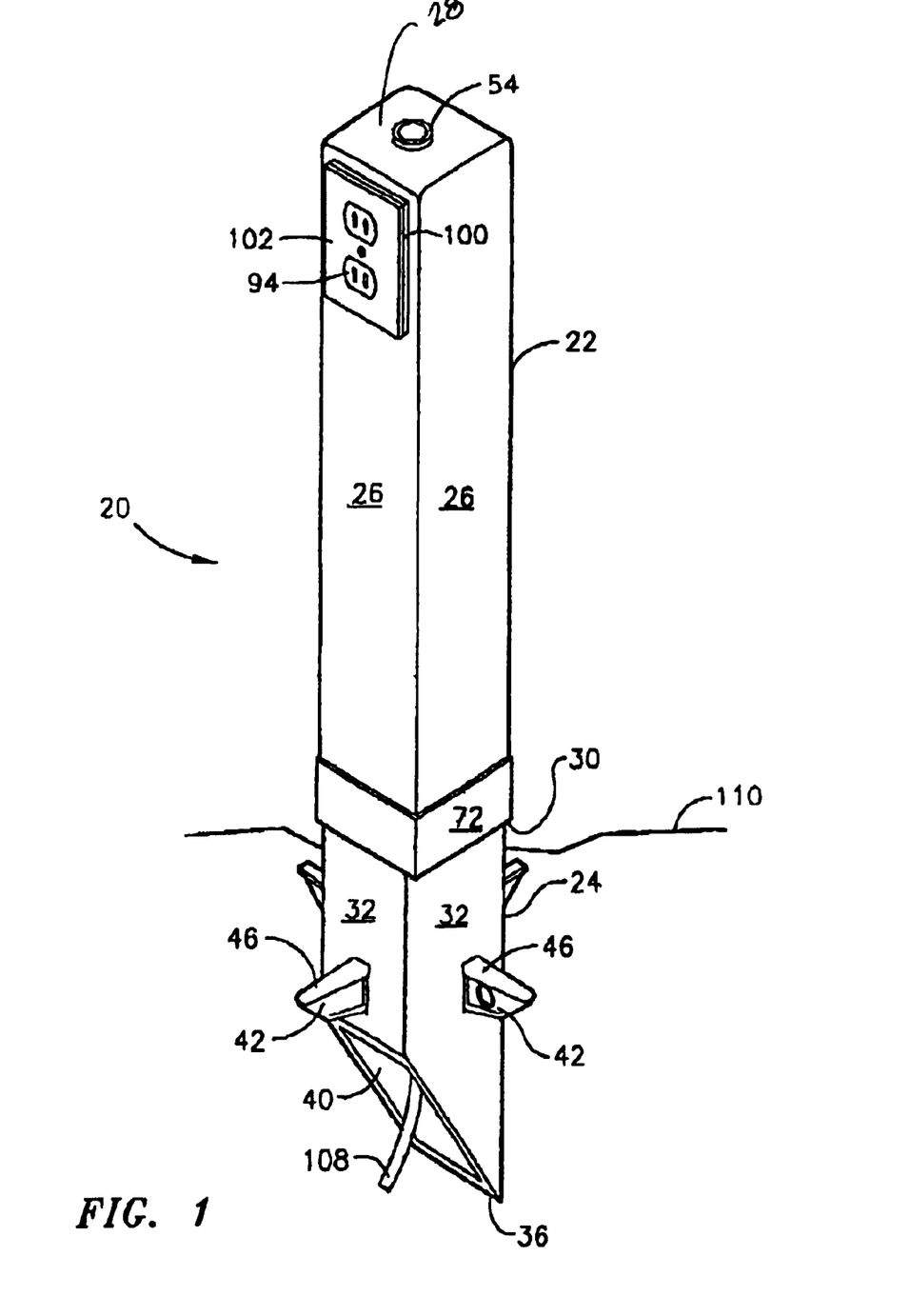
FIG. 1 is a perspective view of a preferred embodiment of the mounting device of the present invention.

Referring now to FIG. 1, a mounting device or garden post 20 according to the present invention is shown. The preferred embodiment of the mounting device is comprised of a top member 22 and a base member 24. The top member 22 and base member 24 are typically rigid, hollow, and formed in an injection molding process with a sufficient wall thickness to support the combined fixture and make it sturdy enough to resist lawn mowers or similar equipment when mounted in the ground. The top member 22 includes side walls 26, a closed top 28 and an open bottom 30.

Figure 2:
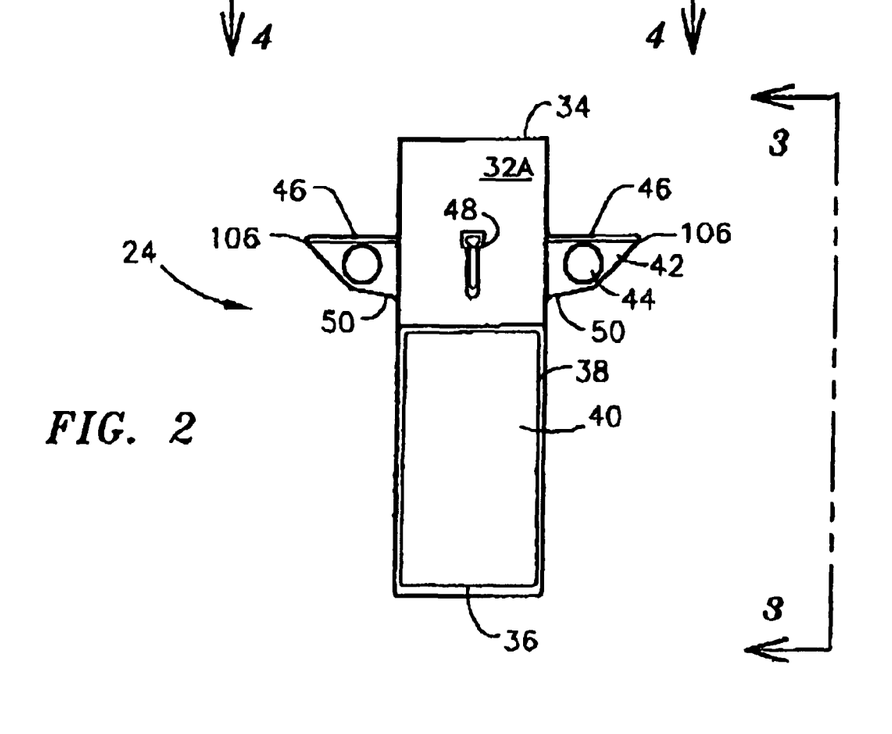
FIG. 2 is a front view of the base member of the present invention.
Figure 3:
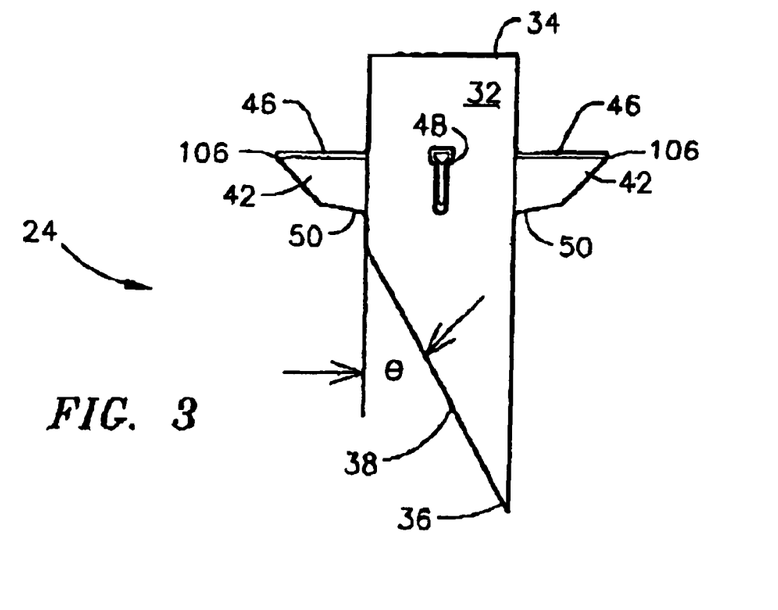
FIG. 3 is a plan view of a closure member according to the present invention.
Figure 4:
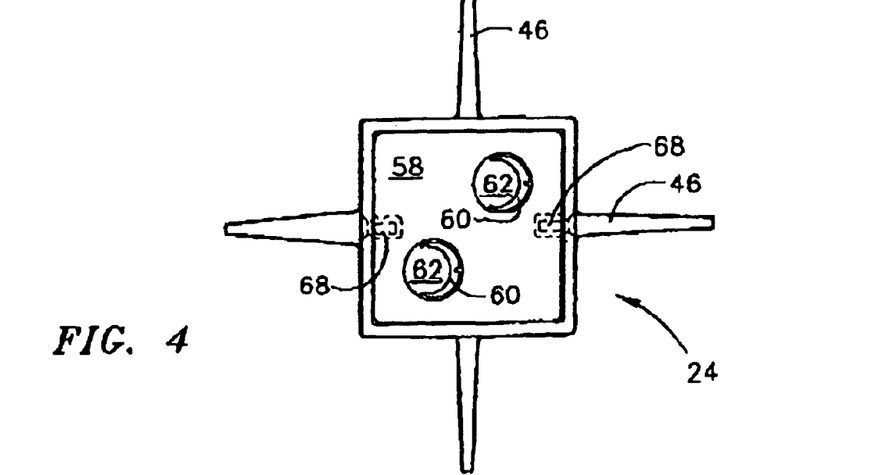
FIG. 4 is a side view of the closure member taken along line 4—4 of FIG. 3.

With reference to FIGS. 2–4, the base member 24 includes side walls 32, an open top 34, and an open bottom 36. The base member 24 includes a bottom edge 38 that is at a sharp angle (θ) with respect to the side wall 32 thereby creating a wide cable entryway 40 on the front side 32A of the base member 24. One or more integral projections 42 extend outwardly from the side walls 32 and may include apertures 44 therein. Stiffening ribs 46 are integral with and oriented at a 90° angle to the projections 42. Fillets 48 are provided around the periphery of the integral projections 42 and stiffening ribs 46 to increase the strength of the projections 42. The lower edges 50 of the integral projections 42 are sharpened to enhance soil penetration. Typically, as shown in FIG. 4, the base member 24 is of a rectangular or approximately square cross section.

Figure 8:
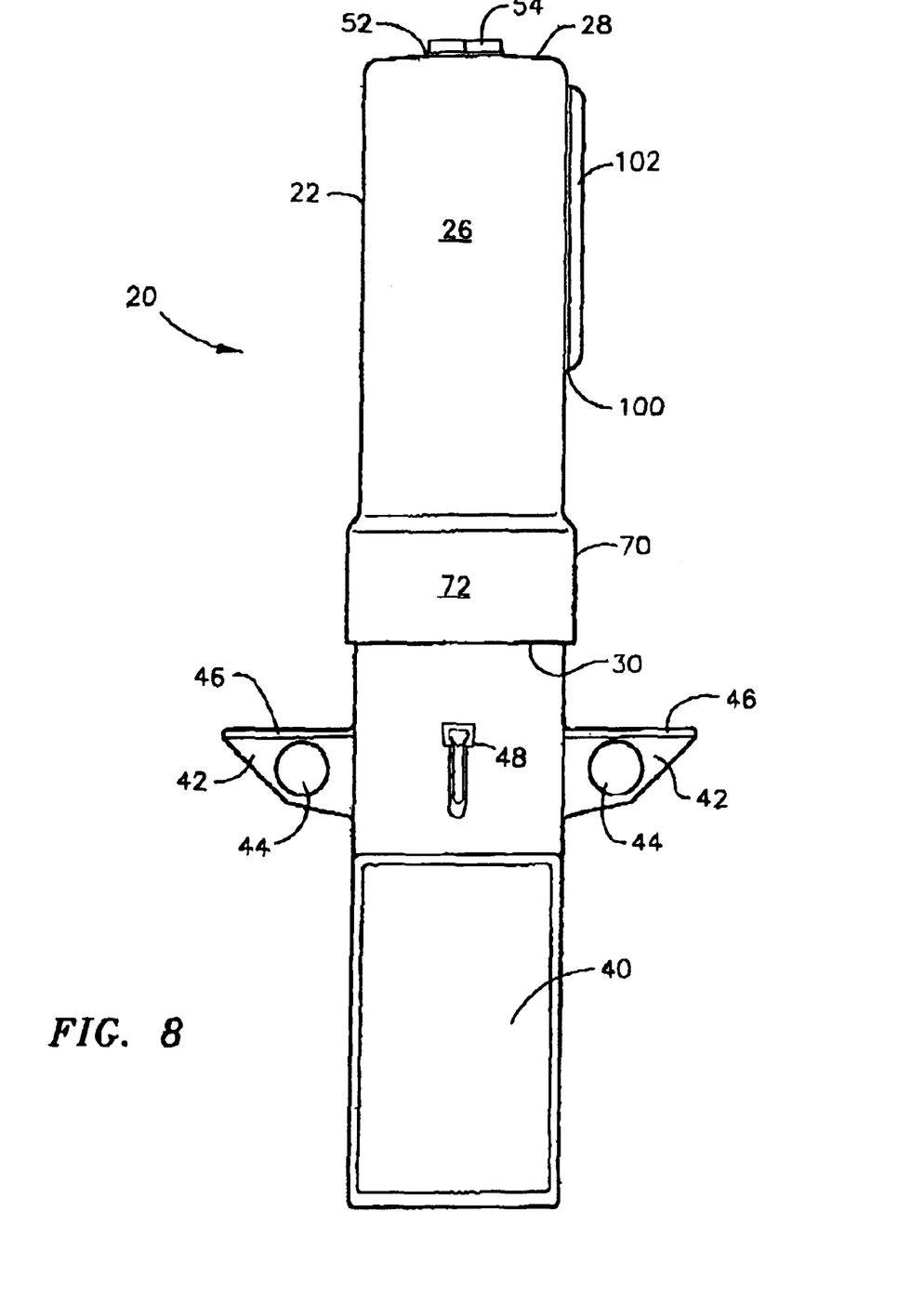
FIG. 8 is a front view of the mounting device of FIG. 1.

Referring to FIG. 8, the top member 22 includes side walls 26, a closed top 28, and an open bottom 30. The closed top 28 typically includes an aperture 52 and an electrically conductive bushing 54 secured within the aperture. The bushing 54 is typically threaded interiorly for screw on attachment of an electrical fixture, such as a light (not shown).

Figure 5:
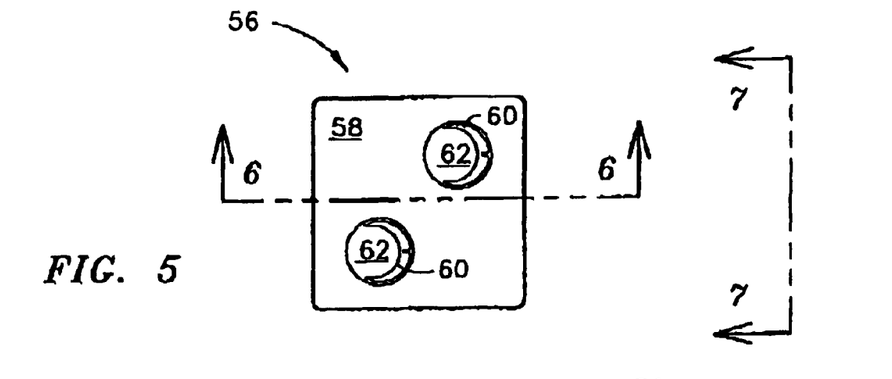
FIG. 5 is an end view of the closure member taken along line 5—5 of FIG. 3.
Figure 6:
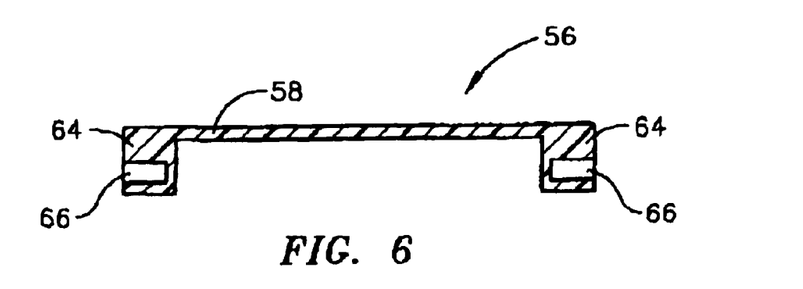
FIG. 6 is a side view of the base member taken along line 6—6 of FIG. 2.
Figure 7:
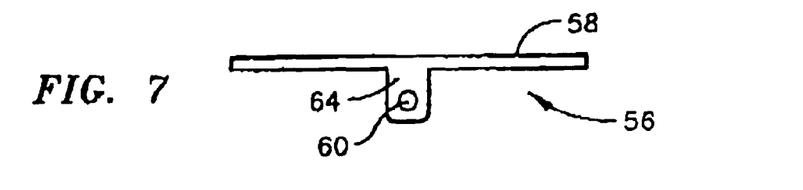
FIG. 7 is a top view of the base member taken along line 7—7 of FIG. 2.

As shown in FIGS. 5–7, a closure arrangement 56 typically consists of a closure panel 58 that is shaped and sized such that it may be secured within the interior of the top member (not shown) or base member 24 (see FIG. 4) in such a manner that it substantially spans between the interior walls of those members. One or more slots 60 and breakaway sections 62 may be formed in the closure panel 58 as shown. Bosses 64 and apertures 66 are provided on the closure panel 58.

Referring to FIG. 4, the closure panel 58 may be used as a closure arrangement 56 to close off and seal the hollow interior of the base member 24, as shown, or the top member (not shown). The closure panel 58 is secured within the hollow top or base member 24 by fasteners 68 as shown.

Figure 9:
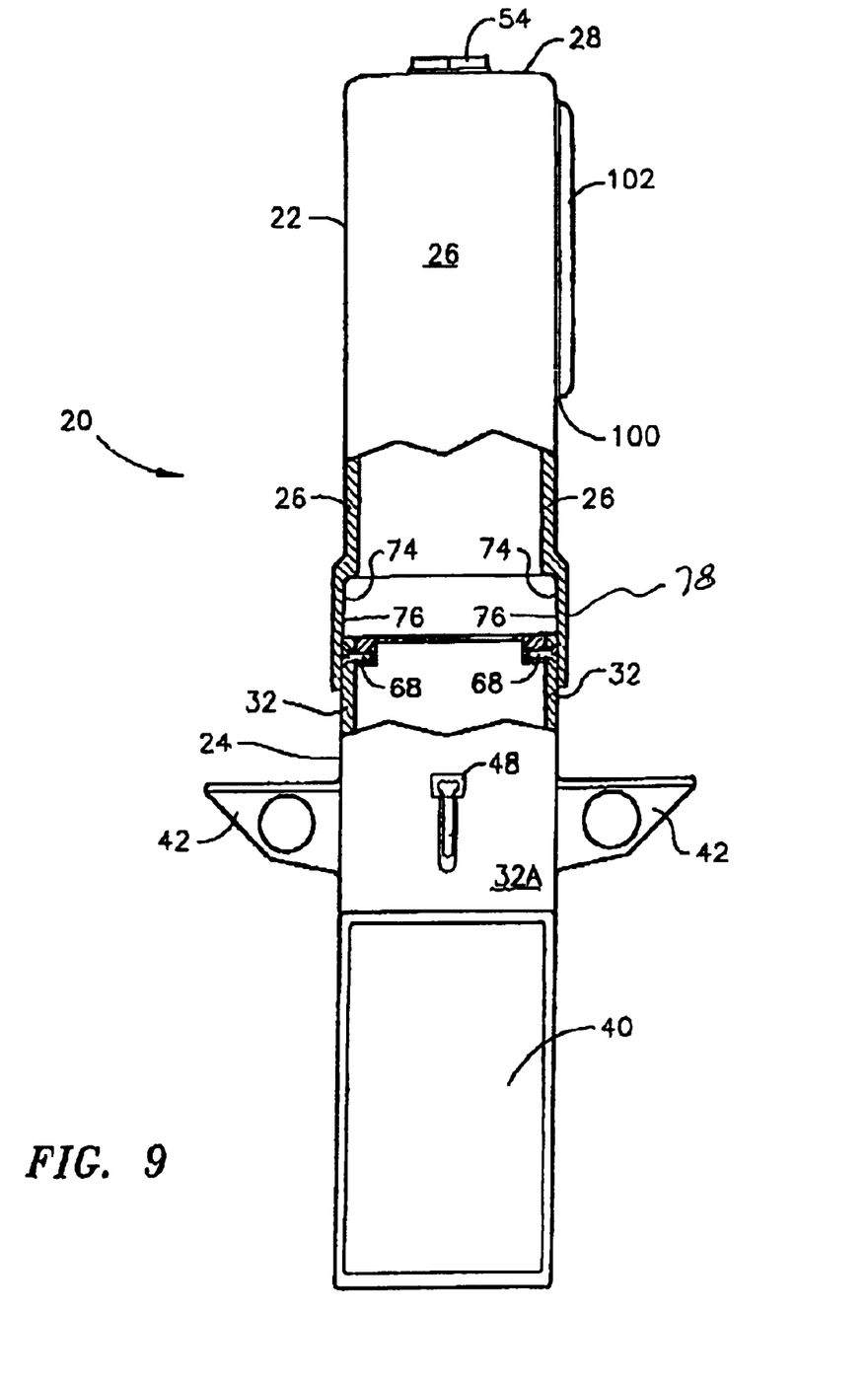
FIG. 9 is a front view of the mounting device of FIG. 1 with a portion of the side wall of the top member broken away.

Referring to FIGS. 8 and 9, a fastening arrangement 70 for securing the top member 22 to the base member 24 includes a collar 72 at the open bottom 30 of the top member 22. The collar 72 is an integral portion of the side walls 26 of the top member 22 that is flared out to include inner walls 74. The dimension across the inner walls 74 of the collar 72 is slightly larger than the dimension across the outer walls 32 of the base member 24. Adhesive 76 may be applied to the inner walls 74 of the collar 72 and the outer walls 32 of the base 24 in the joint area 78 depicted in FIG. 9.

Figure 10:
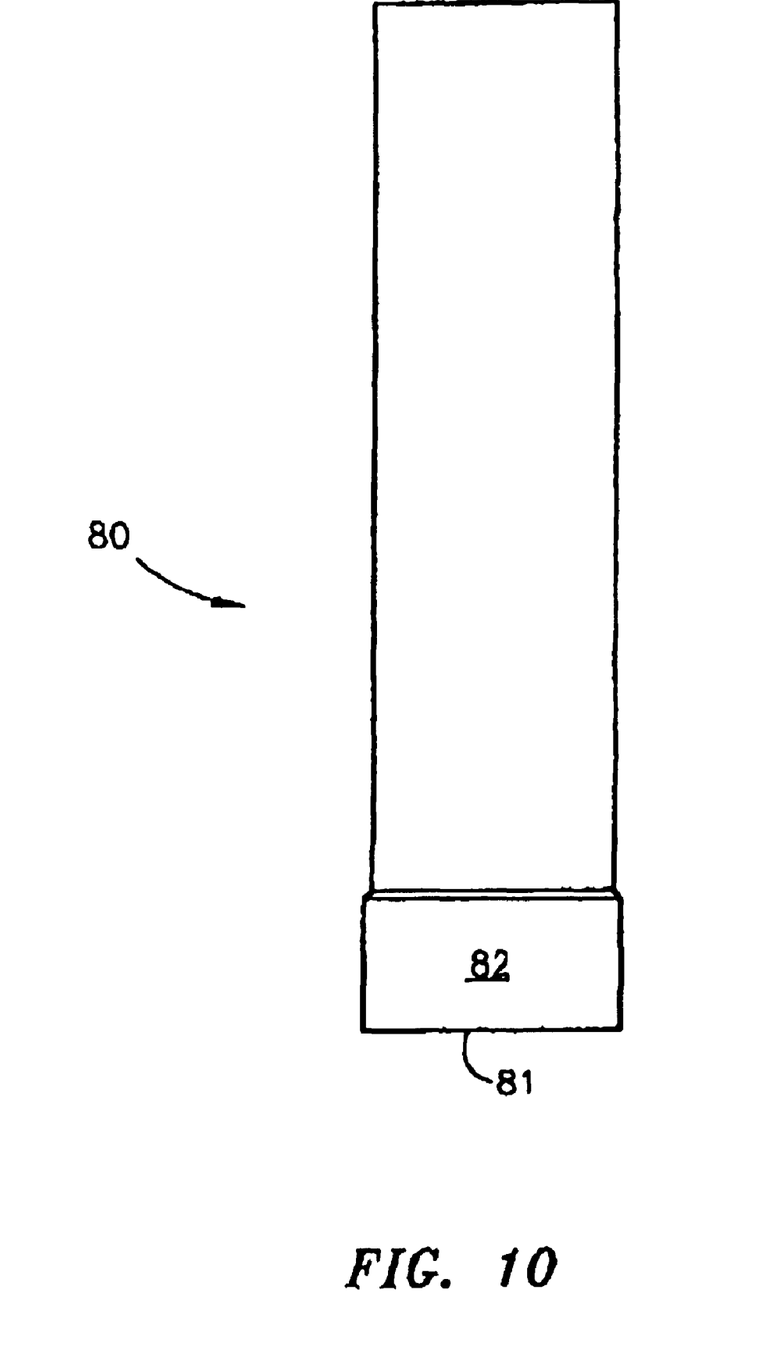
FIG. 10 is a side view of an extender according to the present invention.

Referring to FIG. 10, the mounting device of the present invention may include one or more extenders 80 for extending the length of the mounting device (not shown). The extender 80 also includes a collar 82 to enable the extender to be joined to a second extender (not shown) or to a base member (not shown) by the same fastening arrangement described above.

Figure 11:
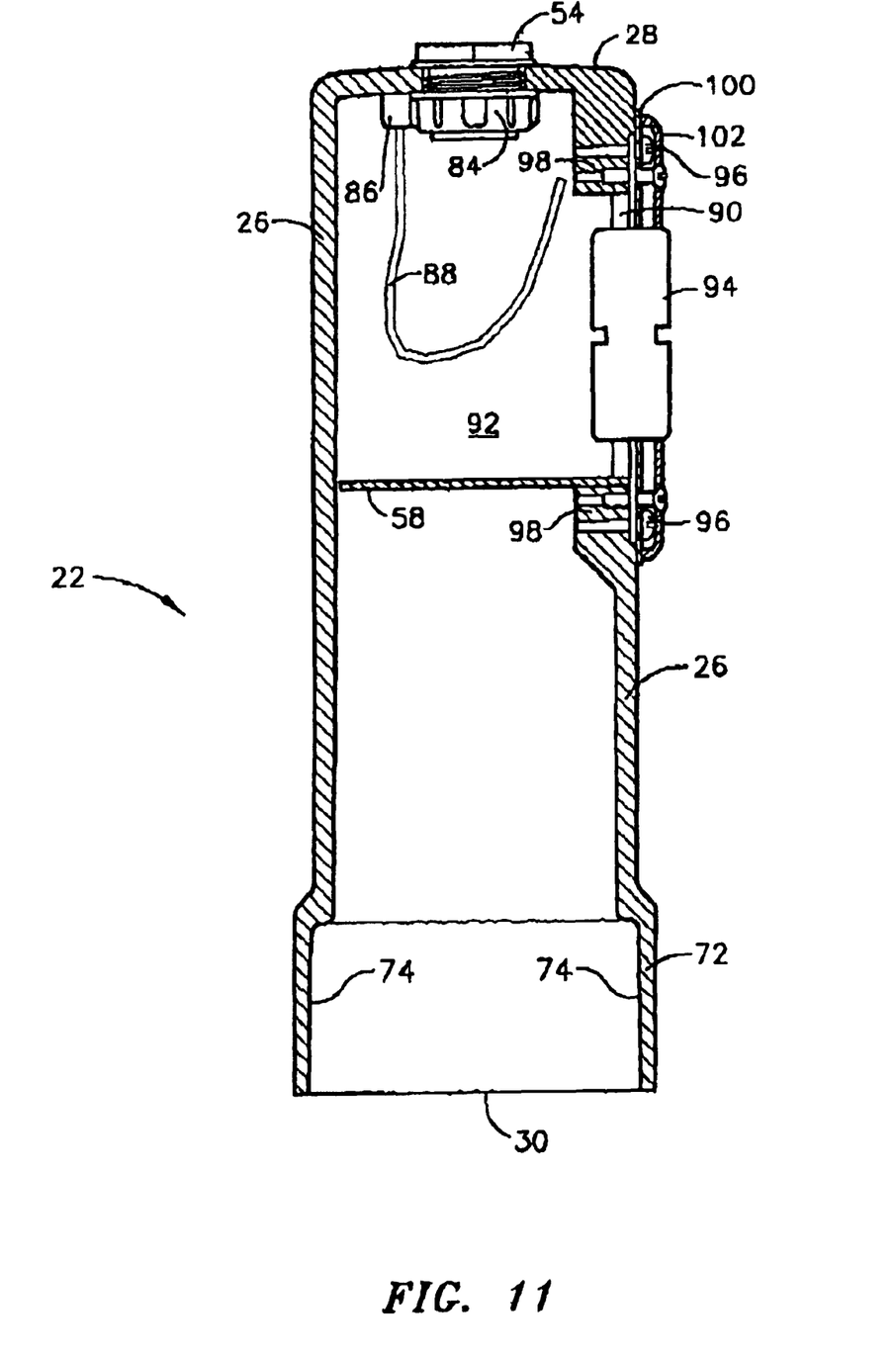
FIG. 11 is a sectional view of the top member of the present invention configured to provide a standard size electrical box.

As shown in the cross-sectional view of FIG. 11, the electrically conductive bushing 54 is typically threaded on its interior and its exterior and is secured to the closed top 28 of the top member 22 by a correspondingly threaded and electrically conductive nut 84. The bushing 54 typically includes a grounding lug 86 and a grounding wire 88. The top member 22 typically includes one or more openings 90 in one of the side walls 26 as shown. Securing the closure panel 58 within the top member 22 as shown creates a standard size electrical junction box 92. Wiring connections may then be completed within the junction box 92 and a wall-mounted electrical device, such as the duplex receptacle 94 depicted in FIG. 11, may be secured by fasteners 96 into integral bosses 98 on each end of the opening 90. A gasket 100 and the complementary face plate 102 can then be secured over the opening 90 to seal the electrical box 92 and the connections within against rain and moisture.

Figure 12:
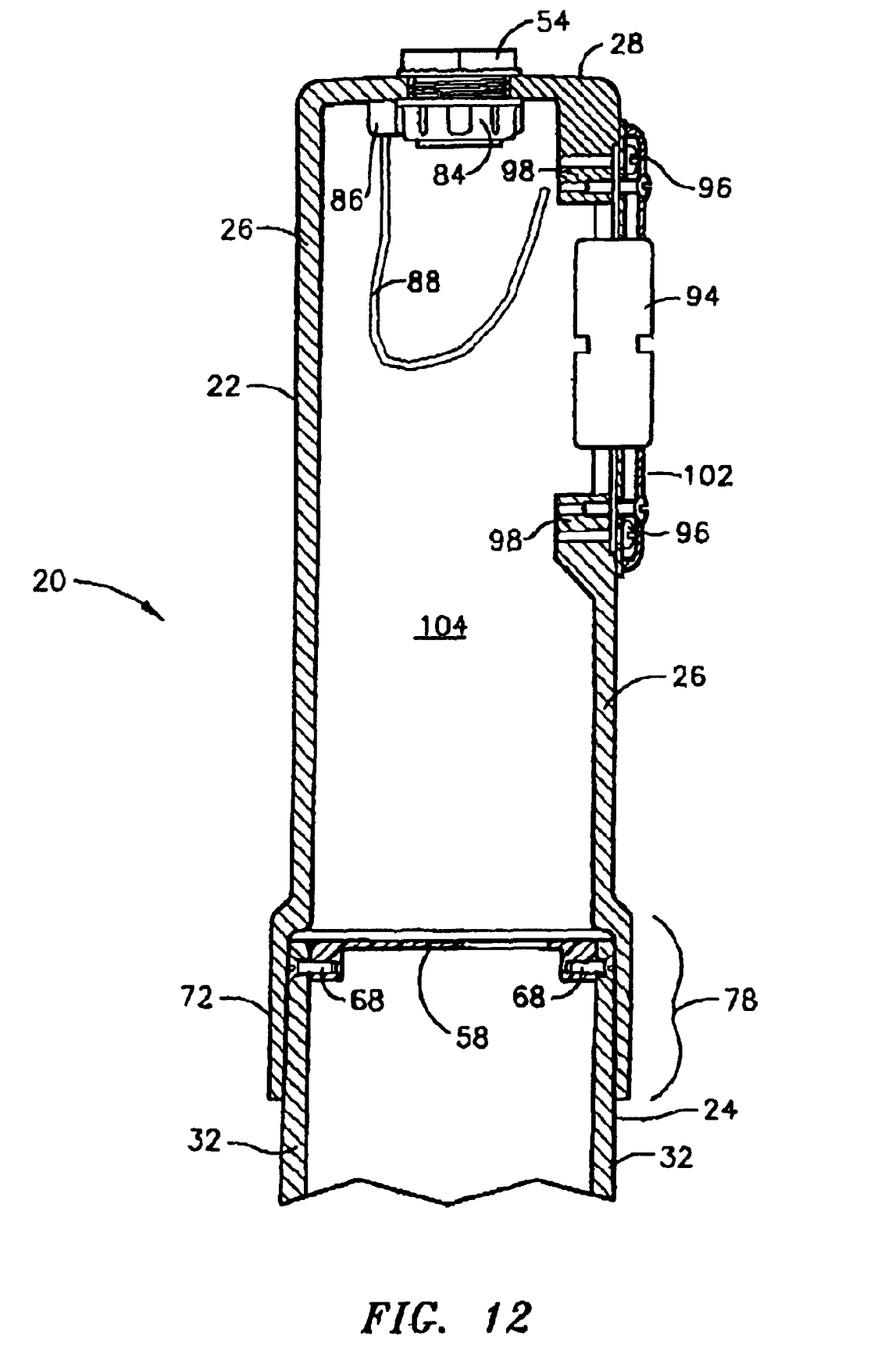
FIG. 12 is a sectional view of the top member of the present invention configured to provide a large size electrical box.

Alternatively, with reference to FIG. 12, the closure panel 58 can be secured within the base member 24 as shown to create a large electrical junction box 104. A large junction box may be preferred in those situations in which a user wishes to install more than one electrical device in the post 20.

A presently preferred material for forming the top member, bottom member, and extender is plastic such as polyvinyl chloride (PVC), polycarbonate, acrylonitrile-butadiene styrene (ABS), or polyethylene. Other materials may be used for construction of the various members as well, such as metal. Preferably, the side walls of the top member 22 and the base member 24 are from 0.1 to 0.5 inch thick. A preferred embodiment formed of polycarbonate or polyvinyl chloride is more preferably 0.15 to 0.25 inch thick. It is desired to keep the wall thickness as thin as possible while still providing the proper strength and rigidity for the assembled garden post, as the device will be less expensive to produce. By providing a top member 22, extender 80, base member 24, and a cover formed by injection molding of a pigmented plastic, the elongated body does not exhibit discoloration from chipping. Therefore, the body and cover have the advantage of not showing chips and dents from accidental bumps by lawn mowers, yard tools, and the like.

As shown in FIG. 9, the top member 22 and base member 24 are assembled and secured together, typically with a solvent cement, to form a secure bond between the various pieces. If the various members are molded of PVC, a PVC solvent cement would typically perform a weld much like the weld on metal pipes. When the solvent cement is applied to each adjacent piece, the plastic surfaces are softened and meld together. Once the joint is assembled, the solvent evaporates leaving behind a hardened resin and a joint that is more durable than the plastic pieces themselves. One suitable PVC cement is that provided by Hercules Chemical Co., Inc., in Passaic, N.J.

Now referring to FIGS. 2 to 4, the base member 24 includes several integral projections 42 extending outwardly from the side walls 32. One or more of the integral projections 42 may include apertures 44. The apertures 44 are available to accept growing roots or insertion of rebar or similar reinforcing members to provide additional ground anchoring strength. The apertures 44 also reduce the amount of polymer required in the molding operation, thereby reducing production cost of the base member 24. A stiffening rib 46 is provided on the top edge of the integral projections 42 to increase strength and rigidity. Fillets 48 are provided at all edges of the junction of each integral projection 42 with the side walls 32 of the base member 24 to further increase the strength of the integral projections. A sharpened lower edge 50 is provided on the bottom edge of each integral projection 42 to enhance soil penetration ability. The length of each integral projection extending from the side wall 32 of the base member 24 to their distal ends 106 is typically at least 70% of the width of the base member 24. Therefore, for a typical embodiment in which the outer width of the base member is 3.25 inches, each integral projection 42 is at least 2.28 inches in length from the side wall 32 of the base member 24 to the distal end 106 of the integral projection 42.

Referring to FIGS. 2 and 3, since the base member 24 is hollow, the sloped bottom edge 38 creates a large entryway 40 for running cable into the garden post. The base member is typically 12 inches in length, although longer lengths would be acceptable. The bottom 36 of the base member 24 is planar and at a sharp angle to the side wall 32. The preferred angle of the plane with respect to the side wall 32 is approximately 25 degrees, but may acceptably be between 20 and 40 degrees. This forms a large entryway 40 for the passage of cables (not shown) into the post. This large cable entryway 40 makes it very convenient to lead an underground electrical feed into the garden post, as the large opening is typically 3.0 inches wide by 7.5 inches long. If the post is buried a foot in the ground, cables buried from 5 inches to 12 inches deep will line up with the opening, making it easy and convenient to lead cables (not shown) into the entryway 40. As shown in the top view of FIG. 4, the base member 24 preferably includes four integral projections 42, with one extending from each side wall 32.

Referring to FIGS. 9 and 10, the bottom end 81 of the extender 80 and the bottom end of the top member 22 are flared to a size slightly larger than the outer dimensions of the non-flared portions of the extender 80 and base member 24. The non-flared portions of the top member 22, extender 80, and base member 24 are all preferably equal in dimension and are typically 4.000 inches wide across the outer walls. The dimension across the inner walls of the flared portion or collar 82 of the extender 80 and the inner walls 74 of the collar 72 on the top member 22 are equal and typically 4.062 inches. Therefore, when fitting the top member 22 on top of the base member 24 or on top of an extender 80, or the extender 80 on top of the base member 24 or on top of another extender 80, typically 0.031 inch of clearance is available between the inner walls of the flared section and the outer walls of the non-flared section of the pieces being joined. If the members are constructed of PVC, the PVC cement is typically spread on the inner walls of the flared portion and the outer walls of the top of the member it will be joined to. With the vertical overlap between the flared portion and the non-flared portion measuring typically 2.0 inches, a great deal of surface area is available between the two pieces for bonding. The flared portion is located on the bottom portion of the top piece to enable rainwater to run off the flared portion and away from the joint.

To operate the mounting device 20 of the present invention, an installer would typically secure the top member 22 to the base member 24 with PVC cement. Typically the mounting device is assembled at the installation site. The installer first decides whether a standard sized or large sized electrical box is desired. The closure panel 58 can then be secured either to the top member 22 (see FIG. 11) to create a standard sized electrical box 92, or to the base member 24 (see FIG. 9) to create a large electrical box 104. The closure panel 58 is typically secured with fasteners 68 to either the top 22 or base member 24. The top and bottom members, and any extenders there between, if so desired, may then be secured together with adhesive. After the adhesive dries, a sturdy mounting platform is thereby created for mounting electrical fixtures and devices in the ground. A hole is then dug in the ground at the desired location and the mounting device 20 placed therein. As shown in FIG. 1, cable 108 is then typically run through the post 20 starting at the open bottom 36 of the base portion 24, through a slot 60 or knockout 62 in the closure panel 58, into the electrical box 92 and then out the opening 90 in the side wall 26 of the top member 22. The bottom end 36 of the garden post 20 is then covered with soil and the soil packed to hold the post securely. The ground level 110 typically covers the integral projections 42 as shown. A fixture, such as a light fixture, can then be screwed into the bushing 54 on top of the assembled and anchored post 20. Wiring connections can then be completed to the fixture and, if desired, to one or more electrical devices, such as a duplex receptacle, switch, or photocell. The electrical device, such as a duplex receptacle 94, is then secured with fasteners 96. A gasket 100 and a faceplate 102 are then secured over the electrical device with fasteners to create a sealed and watertight junction box and thereby complete the installation. The resultant junction box can be a standard size or large size as determined by the installers needs.

As described herein, a garden post according to this disclosure can be constructed of many different heights, such as short, intermediate, or tall, by installing additional extenders between the top member and base member. Therefore, additional stability may be required to anchor the garden post into the ground as the height is increased. The length of the integral projections extending from the side wall of the base member to their distal ends is typically at least 70% of the width of the base member. Typically, taller embodiments of the garden post would include integral projections that extend even further from the side walls of the base member to provide additional stability and a better ground anchor.

The garden post is designed and constructed to accept line voltage, or 120-volt power, and devices and fixtures requiring line voltage. However, it also may easily be used for low-voltage lights and fixtures if preferred.

Suitable gasket materials may be any of the commonly available flexible waterproof materials, such as rubber (natural or synthetic), Neoprene™, Santoprene™, or other flexible and deformable polymeric materials.

While the invention has been described by reference to the preferred embodiment disclosed herein, the invention is subject to considerable modification and may be tailored to fit the needs of many suitable mounting needs without departing from the scope or spirit of the claims which are appended hereto.

What is claimed is:

1. A mounting device for electrical fixtures and devices, comprising:

a top member including a rigid, hollow, elongated body having side walls, a closed top and an open bottom;

a base member including a rigid, hollow, elongated body having side walls and an open top;

a fastening arrangement for securing said top member to said base member;

a closure arrangement secured within said top or said base member, said closure arrangement spanning substantially between the interior of said side walls of said members to create an electrical junction box;

one or more openings in said side wall of said top member, said openings communicating with said electrical junction box;

one or more sections formed in said closure arrangement to enable easy knockout of said sections as desired for passage of cables;

one or more integral projections extending outwardly from said side walls of said base member; and a cover secured across said opening;

wherein said fastening arrangement includes a collar on said open bottom of said top member, said collar including inner walls, said inner walls of said collar slightly larger than the outer portion of said side walls of said base member, and an adhesive disposed between said inner walls of said collar and said outer portion of said side walls of said base member, said adhesive securing said top member to said base member.

2. A mounting device for electrical fixtures and devices, comprising:

a top member including a rigid, hollow, elongated body having side walls, a closed top and an open bottom;

a base member including a rigid, hollow, elongated body having side walls and an open top;

a fastening arrangement for securing said top member to said base member;

a closure arrangement secured within said top or said base member, said closure arrangement spanning substantially between the interior of said side walls of said members to create an electrical junction box;

one or more openings in said side wall of said top member, said openings communicating with said electrical junction box;

one or more sections formed in said closure arrangement to enable easy knockout of said sections as desired for passage of cables;

one or more integral projections extending outwardly from said side walls of said base member;

a cover secured across said opening; and one or more extenders secured between said top member and said base member, said extender including a rigid, hollow, elongated body having side walls with an open top and an open bottom.

3. The mounting device of claim 2 wherein said fastening arrangement includes a collar on said open bottom of said extender, said collar including inner walls;

said inner walls of said collar slightly larger than the outer portion of said side walls of said base member; and an adhesive disposed between said inner walls of said collar and said outer portion of said side walls of said base member, said adhesive securing said top member to said base member in a permanent joint.

4. The mounting device of claim 3 wherein said extender may be joined to a second extender by spreading an adhesive on the inner surface of said collar of said extender and on the outer walls of said open top of said second extender and joining said extender and said second extender together.

5. The mounting device of claim 1 wherein said closed top includes an aperture and an electrically conductive bushing secured in said aperture.

6. The mounting device of claim 1, wherein said closed top of said top member includes an aperture having walls and interior threads formed along said walls.

7. The mounting device of claim 1, wherein said hollow elongated bodies are of a rectangular cross section.

8. A mounting device for electrical fixtures and devices, comprising:

a top member including a rigid, hollow, elongated body having side walls, a closed top and an open bottom;

a base member including a rigid, hollow, elongated body having side walls and an open top;

a fastening arrangement for securing said top member to said base member;

a closure arrangement secured within said top or said base member, said closure arrangement spanning substantially between the interior of said side walls of said members to create an electrical junction box;

one or more openings in said side wall of said top member, said openings communicating with said electrical junction box;

one or more sections formed in said closure arrangement to enable easy knockout of said sections as desired for passage of cables;

one or more integral projections extending outwardly from said side walls of said base member;

a cover secured across said opening;

top edges on said integral projections;

apertures in said integral projections;

a stiffening rib along said top edge;

fillets at the junction of said integral projections with said side wall of said base member; and a sharpened lower edge.

9. The mounting device of claim 5, wherein said bushing comprises a pipe threaded interiorly and exteriorly and secured to said top by a correspondingly mated nut on the interior of said hollow body.

10. The mounting device of claim 9 further comprising a fixture having a threaded nipple, said fixture mounted to said bushing on said top of said elongated body by rotating said nipple within interior threads of said bushing.

11. The mounting device of claim 1 further comprising a plurality of integral bosses formed in the side walls of said top member, including one at the upper end of said opening and one at the lower end of said opening with each of said bosses including one or more apertures for securing an electrical device thereto.

12. The mounting device of claim 5 further comprising a fixture mounted to said bushing on said top of said elongated body and an electrical device secured in said electrical junction box.

13. The mounting device of claim 11 wherein said apertures in said bosses are threaded to accept standard screws used for securing electrical devices and complementary face plates for said electrical devices.

14. The mounting device of claim 1 wherein said fastening arrangement for securing said top member to said base member includes no visible fasteners thereby making said joint aesthetically pleasing in appearance.

* * * * *